United States Patent [19]

Dobler et al.

[11] 4,243,891

[45] Jan. 6, 1981

[54] APPARATUS FOR DETECTING HOLES IN WEBS OF PHOTOGRAPHIC PAPER OR THE LIKE

[75] Inventors: Rudolf Dobler, Fürstenfeldbruck; Klaus Weber, Leverkusen, both of Fed. Rep. of Germany

[73] Assignee: AGFA-Gevaert, A.G., Leverkusen, Fed. Rep. of Germany

[21] Appl. No.: 919,286

[22] Filed: Jun. 26, 1978

[30] Foreign Application Priority Data

Jun. 25, 1977 [DE] Fed. Rep. of Germany ........ 2728728

[51] Int. Cl.$^3$ .................... G01K 21/86

[52] U.S. Cl. .................... 250/571; 250/227

[58] Field of Search .................... 250/227, 231 SE, 548, 250/570, 239, 569, 571, 572; 235/458, 459, 460, 461

[56] References Cited

U.S. PATENT DOCUMENTS 3,354,467 11/1967 Beekley .................... 235/458

3,585,396 6/1971 Ferguson et al. .................... 235/458

3,836,958 9/1974 McMurty .................... 250/227

3,874,791 4/1975 Thieme et al. .................... 250/227

4,068,121 1/1978 Bringhurst et al. .................... 250/227

4,084,099 4/1978 Harvey et al. .................... 250/548

*Primary Examiner*—David C. Nelms

*Attorney, Agent, or Firm*—Peter K. Kontler

[57] ABSTRACT

Apparatus for detection of holes in a running web of photographic paper has a U-shaped housing with two spaced-apart legs between which a portion of the web travels toward a severing device. One leg of the housing contains several photoconductive detectors, and the other leg of the housing contains the light emitting portion of a light conducting prism whose light admitting portion is adjacent to a light source mounted in the housing inwardly of the detectors. The prism disperses the incoming light so as to uniformly illuminate the web portion in the gap between the two legs of the housing. The light source, the detectors and an amplifier for signals which are transmitted by the detectors are mounted on a plate which further carries conductors connecting the detectors with the amplifier.

18 Claims, 2 Drawing Figures

14B
114B
114D
14D
14b
3a
4
3b
5
10
8
9
11
7
14E
3
114A
14
14A
14a
13
CONDUCTORS
12
1
3c

APPARATUS FOR DETECTING HOLES IN WEBS OF PHOTOGRAPHIC PAPER OR THE LIKE

BACKGROUND OF THE INVENTION

The present invention relates to apparatus for detecting indicia in webs or sheets, especially in moving webs. More particularly, the invention relates to improvements in apparatus for monitoring a running web of photographic paper or the like for the presence of indicia in the form of holes, notches, cutouts and like markers which are obtained by removing material from the web (for the sake of simplicity, such indicia will be called holes with the understanding that the term "holes" also embraces notches, perforations and like voids through which light is free to pass from the one side to the other side of the web).

Webs of exposed and developed photographic paper are provided with holes to denote successive prints. Such holes are monitored by a photoconductive detector system which is installed in a photographic processing laboratory and transmits signals to the transporting system for the web and/or to apparatus which process the web, particularly to a severing mechanism which subdivides the web into discrete prints. Such prints are assembled with corresponding customer films and are returned to dealers or directly to customers. Reference may be had to commonly owned U.S. Pat. No. 4,039,258 granted Aug. 2, 1977 to Hujer et al.

Certain presently known apparatus for detection of holes in running webs of photographic paper comprise a substantially U-shaped housing having two spaced-apart legs. The web is transported lengthwise through the gap between the legs of the housing. One leg contains a photoconductive detector and the other leg contains a light source which directs light against the detector. The detector transmits a signal when it is exposed to light which issues from the source and passes through a hole in that portion of the web which advances through the aforementioned gap. A drawback of such apparatus is that each leg of the housing must contain electric conductors which connect an energy source with the light source and which connect the detector with an amplifier or with another device for reception and processing of signals which are generated when the detector is exposed to light.

German Offenlegungsschrift No. 2,246,066 discloses an apparatus which employs two elongated filamentary light conductors disposed at one side of the path for the moving web. One end portion of each light conductor is immediately adjacent to the respective side of the web so that light which issues from the end portion of one light conductor is reflected by the moving web and enters the end portion of the other light conductor. The second end portion of the one light conductor is connected with a light source, and the second end portion of the other light conductor directs light against a detector. When the light which issues from the one conductor penetrates through a hole of the moving web, the detector transmits a signal which is indicative of the presence of a hole. The filaments of the light conductors are twisted so that the conductors form a cable of helically interlaced filaments. Such apparatus, too, exhibit serious drawbacks. Thus, the light conductors must consist of a high-quality material and they must be assembled and mounted with a high degree of precision. Furthermore, the range of such apparatus is very narrow, i.e., the apparatus can only detect holes of a given size and/or shape, and the holes must be located at a fixed distance from the margins of the running web.

OBJECTS AND SUMMARY OF THE INVENTION

An object of this invention is to provide an apparatus for detection of holes in a running web of photographic paper or the like which is simpler and less expensive than heretofore known apparatus.

Another object of the invention is to provide an apparatus whose versatility greatly exceeds the versatility of conventional apparatus.

A further object of the invention is to provide an apparatus which can detect holes of any desired size and/or shape and which can detect holes which are closely adjacent to or remote from the one or the other marginal portion of the web.

An additional object of the invention is to provide the apparatus with novel and improved means for conveying light from the source to the photoconductive detector means.

A further object of the invention is to provide an apparatus which can be utilized as a superior substitute for existing hole-monitoring apparatus in photographic processing laboratories or similar establishments.

The invention is embodied in an apparatus for scanning a running web for the presence of holes, particularly for monitoring a web of coherent exposed and developed photographic prints for the presence of holes which are associated with successive prints or denote the last print of a customer order. The apparatus comprises means for advancing the web lengthwise along a predetermined path (e.g., in a direction toward a severing station where the web is subdivided into discrete prints by cutting the web transversely along the frame lines between neighboring prints), photoconductive detector means adjacent to one side of the path, a light source remote from the path (such light source is preferably installed at the one side of the path but outwardly adjacent to the nearest marginal portion of the running web), and a prism or other suitable means for optically coupling the source with the detector means. The coupling means includes a light admitting portion which is adjacent to the light source and a light emitting portion located opposite the detector means at the other side of the path so that the detector means is exposed to light when a hole is located between the light emitting portion and the detector means. The detector means may include two or more discrete detectors which form a row preferably extending transversely of the path for the moving web.

The light emitting portion of the coupling means is preferably designed to uniformly illuminate that portion of the web which is adjacent to the detector means. If the coupling means is a light conductor in the form of a prism (e.g., a triangular prism which may consist of Plexiglas), one end portion of the prism constitutes the light admitting portion and the other end portion of the prism constitutes the light emitting portion.

The detector means, the light source and amplifier means for signals which are transmitted by the detector means can be mounted on a common support (e.g., a plate) which further supports conductor means connecting the detector means with the amplifier means and/or the light source with a source of electrical energy. Such support may be installed in a substantially U-shaped housing one leg of which contains the detector means and another leg of which contains the entire coupling means or at least the light emitting portion of the coupling means. The web advances between the two legs of the housing.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
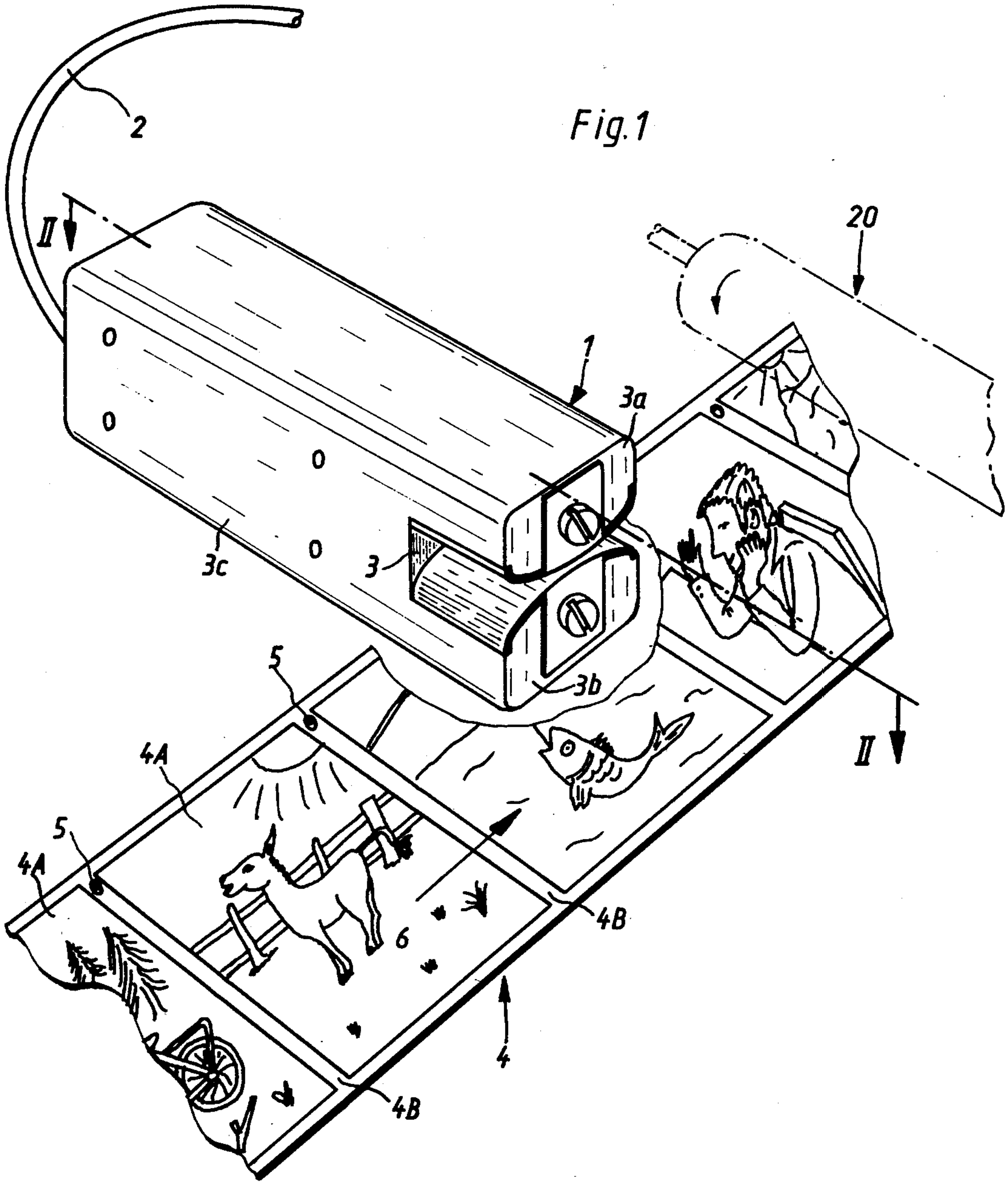
FIG. 1 is a perspective view of an apparatus which embodies the invention.

FIG. 1 shows a web 4 of exposed and developed photographic paper which is transported in the direction indicated by an arrow 6. The means for advancing the web lengthwise comprises at least one pair of driven rolls one of which is indicated by phantom lines, as at 20. These rolls transport the web 4 to a further processing station, e.g., to a severing station in a photographic processing laboratory wherein the web 4 is subdivided into discrete prints 4A by severing it along the frame lines 4B between the neighboring prints 4A. The indicia in the form of holes are shown at 5; these holes are closely adjacent to one marginal portion of the running web, and their detection results in the generation of signals which are utilized to control the operation of the advancing means including the roller 20 and/or the operation of the aforementioned severing means. For example, the web 4 can be arrested whenever a frame line 4B reaches the severing station.

The apparatus for scanning the running web 4 for the presence of holes 5 comprises a substantially U-shaped housing 1 with two spaced-apart portions or legs 3*a*, 3*b* (see also FIG. 2) which are disposed at the opposite sides of the path for the running web 4. That portion of the web 4 which is provided with the holes 5 travels through the relatively narrow clearance or gap 3 between the legs 3*a* and 3*b*. The reference character 2 denotes an electric cable containing conductors which connect the apparatus with a suitable source of electrical energy (not shown) as well as with the controls of the transporting apparatus including the advancing roll 20.

Figure 2:
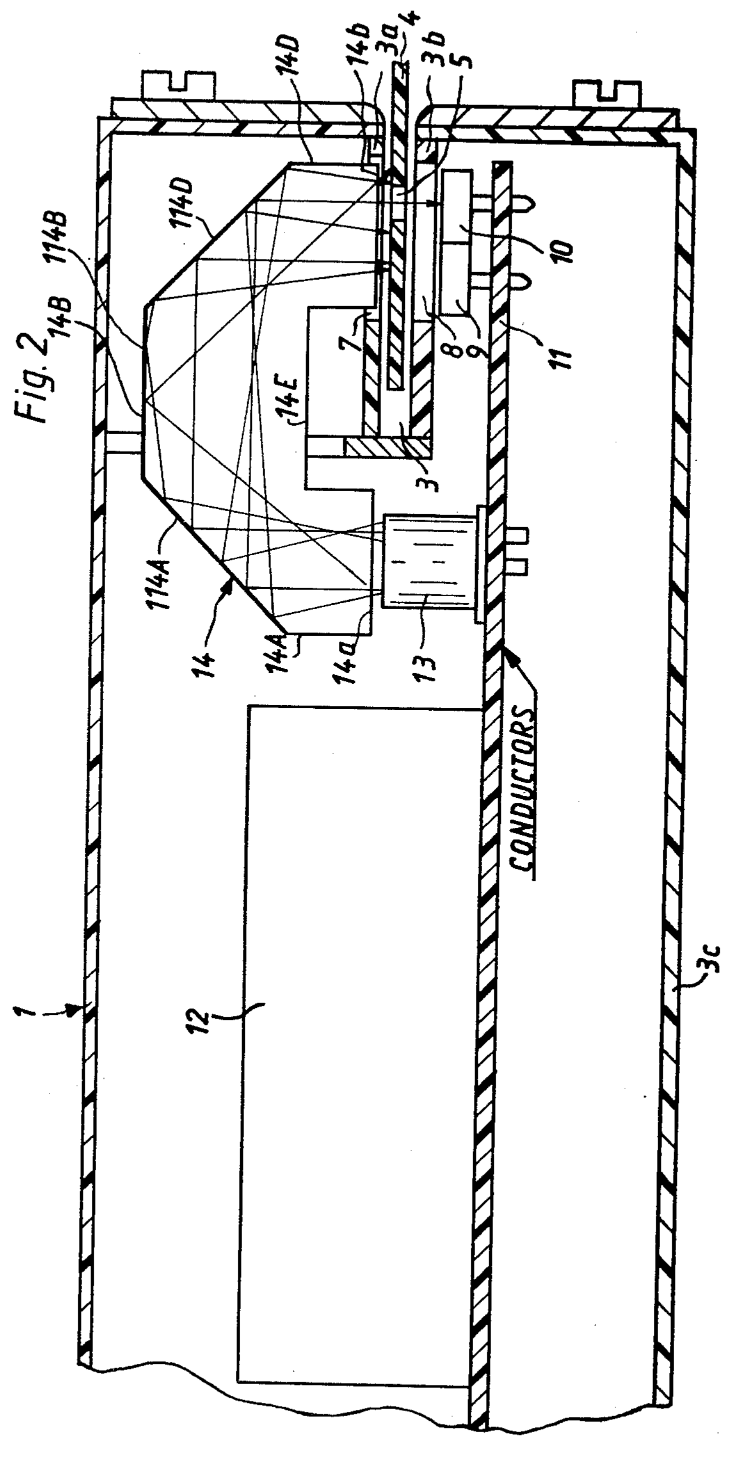
FIG. 2 is an enlarged transverse vertical sectional view as seen in the direction of arrows from the line II—II of FIG. 1.

In FIG. 2, the web 4 travels in a direction at right angles to the plane of the drawing. The leg 3*a* has a wall which is adjacent to the upper side of the path for the web 4 and has an aperture 7. The leg 3*b* comprises a wall which is adjacent to the underside of the path of the web 4 and has an aperture 8 in register with the aperture 7. The width of the apertures 7 and 8, as considered transversely of the path for the web 6, is sufficient to insure that any hole 5 invariably advances between the apertures 7, 8 on its way toward the roll 20.

The photoconductive detector means of the illustrated apparatus comprises two discrete detectors 9 and 10 which are mounted in the leg 3*b* below the aperture 8 and form a row which extends transversely of the moving web 9. The apparatus may comprise a single detector or three or more detectors, depending on the distance between the holes and the left-hand marginal portions of different webs of photographic paper. All that counts is to insure that any hole 5 which advances through the gap 3 invariably travels above a single detector or above one of several detectors. The total number of detectors depends on their dimensions as well as on the width of the opening 8, i.e., on anticipated variations of the distance between the holes 5 and the left-hand marginal portion of the web 4.

The detectors 9 and 10 are mounted on a plate-like support 11 which is installed in the interior of the housing 1 at the underside of the path for the web 4 and further carries a light source 13 (e.g., a single lamp) which is also located at the underside of the web but is remote from the path for the web, i.e., it is located to the left of the left-hand marginal portion of the web 4, as viewed in FIG. 2. Still further, the support 11 carries a preamplifier 12 which is connected to the detectors 9 and 10 by conductor means (designated by a legend) at the underside of the support 11. The conductor means may constitute a printed circuit and may further include leads for connecting the light source 13 with a source of electrical energy via cable 2.

The light-emitting portion of the light source 13 (which is mounted on the support 11 to the left of the gap 3) is relatively large. Light which issues from the upper side of the source 13 (as viewed in FIG. 2) is conveyed into the aperture 7 above the detectors 9, 10 by an optical coupling device or light conductor 14 which is installed in the interior of the housing 1 and includes a light admitting first end portion 14*a* above the light source 13 and a light emitting second end portion 14*b* above the path for the web 4. As shown, the end portion 14*b* can extend into the aperture 7 and its width, as considered at right angles to the direction of movement of the web 4, suffices to insure adequate illumination of successive increments of the web above the detectors 9 and 10. The coupling device 14 is a substantially triangular prism which preferably consists of a transparent (glass-like) synthetic plastic material, e.g., Plexiglas. The width of the coupling device 14, as considered in the direction indicated by the arrow 6 of FIG. 1, at least equals or exceeds the maximum width of a hole 5, as considered in the same direction. Thus, the light emitting end portion 14*b* can illuminate an entire hole 5 in the gap 3, at least for a relatively short interval of time.

In order to reduce the weight and space requirements of the coupling device 14, certain non-essential portions thereof are removed. As shown, the device 14 is flattened at the apices (this is indicated by the reference characters 14A, 14B, 14D) and has a cutout 14E in the central part of its hypotenuse or base. The end portions 14*a* and 14*b* are disposed at the respective ends of such hypotenuse.

The operation is as follows:

The drive means for the roll 20 is on, i.e., the web 4 is advanced in the direction of the arrow 6. The left-hand marginal portion or half of the web 4 travels through the gap 3. When a hole 5 advances into the space between the apertures 7 and 8, light which is emitted and uniformly dispersed by the end portion 14*b* of the coupling device 14 can penetrate through the hole 5 and impinges upon one of the detectors (in FIG. 2, such light impinges upon the detector 10). The detector 10 transmits a signal to the preamplifier 12 which transmits an amplified signal to the control means for the drive of the advancing means or to the severing mechanism. The electrical or electronic control system includes suitable signal storing means wherein the signal which is transmitted by the detector 10 is stored until the corresponding hole 5 reaches the severing mechanism.

The source 13 emits light without interruptions, i.e., as long as the web 4 is running, and such light enters the coupling device 14 by way of the light admitting end portion 14*a*. Light which passes through the coupling device 14 is reflected at the surfaces 114A, 114B and/or 114D before it reaches the light emitting end portion 14*b*. Repeated reflection of light insures uniform dispersion and distribution of light which issues from the end portion 14*b* and impinges upon the upper side of the moving web 4. This means that the signal can be generated by the detector 10 or 9, depending on the distance between a detected hole 5 and the nearest marginal portion of the web 4.

An important advantage of the improved apparatus is its simplicity. Furthermore, the apparatus is compact and its versatility exceeds the versatility of conventional detecting apparatus. The detectors 9, 10, the light source 13, the conductors and the amplifier 12 can be installed on the support 11 before the latter is mounted in the housing 1. Proper mounting of the relatively simple and inexpensive coupling device 14 in the leg 3*a* and in the adjacent portion of the web 3*c* of the housing 1 also takes up little time. The apparatus is of lightweight construction and can be readily installed in photographic processing laboratories as a superior substitute for conventional monitoring apparatus.

The manner in which the housing 1 can be taken apart to afford access to the components in its interior is not specifically shown in the drawing. As a rule, all or nearly all components are adequately adjusted prior to insertion into the housing 1 so that the apparatus can be used, without interruptions, for long intervals of time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. Apparatus for scanning a running web for the presence of holes, particularly for monitoring a web of exposed and developed photographic paper for the presence of holes which are associated with successive prints, comprising means for advancing the web lengthwise along a predetermined path; photoconductive detector means adjacent to one side of said path; a light source remote from and located at said one side of said path; and means for optically coupling said source with said detector means, said coupling means having a light admitting portion adjacent to said source and a light emitting portion located opposite said detector means at the other side of said path so that said detector means is exposed to light when a hole is located between said light emitting portion and said detector means.

2. Apparatus as defined in claim 1, wherein said coupling means includes a light conducting coupling portion interconnecting said light admitting and light emitting portions and located at said other side of said path.

3. Apparatus as defined in claim 1, wherein said detector means comprises a plurality of discrete detectors.

4. Apparatus as defined in claim 3, wherein said discrete detectors form a row extending transversely of said path.

5. Apparatus as defined in claim 3, wherein said source includes a single lamp.

6. Apparatus as defined in claim 3, wherein said light emitting portion includes means for substantially uniformly illuminating that portion of the web which is adjacent to said plurality of detectors.

7. Apparatus as defined in claim 1, wherein said coupling means comprises a light conductor including a first end portion which constitutes said light admitting portion and a second end portion which constitutes said light emitting portion.

8. Apparatus as defined in claim 7, wherein said light conductor includes means for uniformly dispersing the emitted light upon the adjacent portion of the web.

9. Apparatus as defined in claim 8, wherein said light conductor is a prism.

10. Apparatus as defined in claim 9, wherein said prism is a triangular prism having a base, said light admitting and light emitting portions of said prism being adjacent to said base.

11. Apparatus as defined in claim 10, wherein at least one apex of said prism is flattened.

12. Apparatus as defined in claim 9 for scanning a running web for the presence of holes having a predetermined width, as considered in the longitudinal direction of the web, wherein the width of said second end portion of said prism, as considered in the direction of movement of the web, at least equals said predetermined width.

13. Apparatus as defined in claim 1, further comprising a common support for said light source and said detector means.

14. Apparatus as defined in claim 13, further comprising amplifier means provided on said support and conductor means provided on said support and connecting said detector means with said amplifier means.

15. Apparatus as defined in claim 1, wherein said coupling means consists of a transparent synthetic plastic material.

16. Apparatus as defined in claim 15, wherein said material is Plexiglas.

17. Apparatus as defined in claim 1, further comprising a housing including first and second portions respectively adjacent to said one and said other side of said path, said portions defining a gap through which a portion of said path extends, said detector means being located in said first portion and said light emitting portion of said coupling means being located in said second portion of said housing.

18. Apparatus as defined in claim 17, wherein said housing is substantially U-shaped, said first and second portions constituting two substantially parallel legs of said housing and said housing further including a web for said light source and said light admitting portion of said coupling means.

* * * * *